Patented Nov. 16, 1937

2,099,529

UNITED STATES PATENT OFFICE 2,099,529

RECOVERY OF SULPHONIC ACIDS

Robert C. Moran, Wenonah, and Walter A. Meyer, Paulsboro, N. J., assignors to Socony-Vacuum Oil Company, Incorporated, New York, N. Y., a corporation of New York No Drawing. Application August 26, 1936, Serial No. 98,086

2 Claims. (Cl. 260—159)

Treatment of hydrocarbon mineral oils with sulphuric acids, resorted to for the improvement of quality of the oil, results as well in the formation of mineral oil sulphonic acid compounds. Increases in relative quantity and/or strength of acid used normally results in increase of bodies of this type. Various oils of differing types also yield different amounts of these compounds. Where formed in sufficient quantities, they are recovered as a by-product, in the form of salts, soaps, or acids, and are frequently valuable articles of commerce, due to emulsification and detergent properties. This invention is directed to a novel method for the recovery of certain of these mineral oil sulphonic acid bodies.

Treatment of mineral oils, as lubricating oil fractions, turbine oils, medicinal white oils, and the like with sulphuric acid results in the formation of a sludge, which, together with the unconsumed acid, is allowed to settle from the oil and is withdrawn. Sulphonic acids formed during the treatment of the oil may be found in both the sludge layer and in the "sour" or acid oil above it. Further treatment of the sludge, as with water, followed by neutralization, results in the separation therefrom of a class of sulphonic acids generally spoken of as "green" sulphonic acids, which are in general more readily soluble in water than in oil. Recovery of these acids may be made conveniently by the process of Humphreys U. S. Patent #1,474,933. The sulphonic acid bodies remaining in the sour oil are generally recovered by treatment of the sour oil, either before or after a neutralization treatment, with an aqueous solution of a water-soluble organic compound which is itself a solvent for the sulphonic bodies. This process results in the recovery of a class of sulphonic acid bodies which are in general more readily soluble in oil than in water, and which, because of their color, are usually spoken of as "mahogany" sulphonic acids.

In the treatment of oils with relatively small amounts of acid, the separation of sludge by gravity is relatively clean. When treating some oils with relatively large amounts of acid, the separation by gravity is not clean, a considerable amount of sludge in the form of fine particles, or "pepper" sludge remaining in the oil. In this latter case, the "sour" oil from which the first settled sludge has been withdrawn, is treated with a small amount of water, which serves to agglomerate the "pepper" and permit of its separation, withdrawal, and disposal with the other sludge. Certain other oils, as for instance oils of 50 to 200 seconds Saybolt viscosity at 100, intended for transformer oils, and treated with relatively large amounts of acid, as from 40 to 150 pounds of 92% sulphuric acid per barrel, used in several dumps, ordinarily do not exhibit a high holdup of "pepper" sludge, but do have a high acidity in the sour state, and require large amounts of caustic for neutralization. To reduce this residual acidity of the sour oil, several means may be used. One method used in normal commercial treating is to "gas blow", that is, to agitate the sour oil with air until largely free of fumes of $SO_2$, then add a small amount of water to coagulate "pepper" sludge, which is withdrawn, and then neutralize in the ordinary fashion. A preferable method is to avoid the gas blow by adding a small amount of water, preferably by spraying it on the top of the oil being treated, and allowing it to settle out, resulting in the formation of a separated product known as "acid jelly", which is withdrawn, after which the oil is neutralized as before.

This invention is based upon the discovery that valuable sulphonic acid products may be recovered from this acid jelly by a process which is much quicker and more economical than former processes for recovery of sulphonic acid bodies from sludge or from sour oil.

Acid jelly is a rather viscous, homogeneous water solution of petroleum sulphonic acids, oil, and sulphur acids. It is readily miscible with water and shows little tendency, even on prolonged standing, to separate oils. As produced by the customary method of refining of oils in iron equipment, it normally contains iron compounds to the extent of say 800 to 1,000 parts per million. A sulphonic acid product, destined for the usual uses of sulphonic acid products in the manufacture of emulsions for use in the textile industry and the like, should be substantially free of iron, as well as of oil of a character which would tend to discolor the emulsions formed.

It has been found that the sulphonic acids contained in this acid jelly may be readily recovered in a substantially iron-free condition, free from oils of a deleterious nature, and of low color content, by a process of neutralization, separation, and salting out. The resulting product is oil-soluble, and an emulsification agent of very considerable value.

As an example of the method of recovery herein disclosed, the recovery of sulphonic acids from the treatment of a petroleum transformer oil stock of about 55 seconds Saybolt viscosity at 100° F. will be described. This oil was treated with 40 pounds per barrel of 92% acid, settled, and the sludge drawn off. Then, the oil being at about 90° F. temperature, about 1% of its volume of water was sprayed on and allowed to settle through the oil. After thorough settling, acid jelly to the extent of about 30 barrels per 1,000 barrels of treated oil settled and was withdrawn, after which the oil was neutralized and finished in the usual manner. The acid jelly, transferred to another vessel, was mixed with about an equal amount of caustic soda solution of about 5° Bé. strength, the quantity being adjusted so that the resulting mixture was just perceptibly alkaline. The neutralized mixture was settled at about 180° F. and separated into three layers, oil and water being parted by an intermediate layer of emulsion-like nature. The top layer, about 1/5 of the whole, was oil; the intermediate layer was a "rag" or emulsion, amounting to about a quarter of the whole, and was a mixture of oil and water, containing considerable iron in the form of precipitated hydroxide; the remainder, or lower layer, was an aqueous solution of sodium sulphonates. The lower layer was carefully withdrawn to avoid contamination by emulsion, and the sulphonates were separated by salting out from the clear amber solution by the addition of common salt. This salting out included the addition of salt either by adding about 30% by volume of a saturated salt solution, or by adding an equivalent amount of salt, followed by violent agitation, followed by settling. The upper layer after settling comprised the product, and was a crude product of light brownish yellow color, consisting principally of sodium salts of petroleum sulphonic acids, with about 30% of water. This product is soluble in oil for the production of emulsions and emulsifiable products, substantially free of iron, and substantially free of oils tending to the discoloration of emulsified products, or of products treated with such emulsions. For example, it may be used in the compounding of emulsion products for use on white leathers.

Such products may be recovered economically from oils of low and medium viscosity which have been treated with relatively high amounts of acid. From oils which have been treated with less than about 40 pounds of acid per barrel, the amount of sulphonic acids produced is usually too small to warrant recovery. The amount of water to be used for the formation and removal of the acid jelly will vary with the amount of acid with which the oil has been treated, varying from about 3/4 to 1% of water on oils which have been treated with 40 pounds of acid per barrel to about 3% of water on oils which have been treated with 150 pounds of acid per barrel. The temperature at which the separation of acid jelly should be carried out will depend upon the viscosity of the oil being treated, using, for example, 90° F. on oils of about 55 seconds Saybolt viscosity, and about 130° F. on oils of 125 seconds Saybolt viscosity. With 40 pounds of acid per barrel of oil, the acid jelly will amount to about 30 barrels per 1,000 barrels of oil, ordinarily, and with 126 pounds of acid per barrel, about 80 barrels of acid jelly will usually be produced per 1,000 barrels of oil.

The preliminary separation of sludge from sour oil should be as complete as practicable before the precipitation of the acid jelly, because inordinate amounts of pepper sludge would tend to carry bodies of high color into the sulphonic product. The process does have a moderate tolerance for pepper sludge, however, and minor amounts of such sludge will not materially alter its generally colorless properties.

The treatment of the acid jelly is generally the same, regardless of the source. The neutralization should be so carried out that the resulting mixture is only slightly alkaline, greater alkalinity resulting in contamination of the product with iron. It is preferred that the strength of the caustic solution used for neutralization be such that the volume required will be about equal to that of the acid jelly treated. Substantial adherence to the disclosed details of neutralization is necessary for the production of sulphonic products of the requisite freedom from iron. If the neutralization is not complete, iron will not be separated. If the neutralization is so carried out that the mixture is more than just slightly alkaline, the iron compounds will fail to collect in the "rag" and will be introduced into the sulphonic bodies. Ordinarily, caustic solution of 5° Bé. to 10° Bé. strength can be used. The separation by salting out after neutralization is preferably carried out at about 180° F. Other salts, such as $Na_2SO_4$ may be used in the salting out process if desired. The treatment of one volume of acid jelly in this manner will normally result in the production of one-half volume of sulphonate product, which will have about 30% water content.

The resulting product, as above noted, is soluble in oil, and is an excellent emulsifying agent, particularly for the production of emulsions for use in the manufacture of textile products, leathers, and the like, which should be free of iron, as well as from oils tending to discolor the finished product.

The foregoing specific example is intended merely as illustrative, and not in any way as a limitation upon the invention. It is intended that the invention be limited only by those limitations, or their equivalents, which appear in the following claims, which endeavor to claim broadly all the inherent novelty herein.

We claim:

1. A process for the recovery of petroleum sulphonic acid compounds of low iron content which comprises the following steps: treating a petroleum oil fraction with sulphuric acid, settling and separating from the oil the sludge so produced, adding to the sour oil a small amount of water, separating and withdrawing the resulting acid jelly, neutralizing the acid jelly with an aqueous alkaline solution, settling and separating from the mixture the aqueous solution of alkaline sulphonic compounds, substantially free of iron hydroxide and associated impurities, and salting out the alkaline sulphonic compounds from the aqueous solution.

2. The process of claim 1 in which the neutralization step is so carried out that the resulting mixture is only so slightly alkaline that iron hydroxide is not present in the aqueous solution of sulphonic compounds and the volume of caustic solution used for neutralization is approximately equal to the volume of acid jelly neutralized.

ROBERT C. MORAN.
WALTER A. MEYER.